(12) United States Patent
Zhang et al.

(10) Patent No.: US 10,812,806 B2
(45) Date of Patent: Oct. 20, 2020

(54) METHOD AND APPARATUS OF LOCALIZED LUMA PREDICTION MODE INHERITANCE FOR CHROMA PREDICTION IN VIDEO CODING

(71) Applicants: Kai Zhang, Beijing (CN); Jicheng An, Beijing (CN); Han Huang, Beijing (CN)

(72) Inventors: Kai Zhang, Beijing (CN); Jicheng An, Beijing (CN); Han Huang, Beijing (CN)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 191 days.

(21) Appl. No.: 16/078,193

(22) PCT Filed: Feb. 21, 2017

(86) PCT No.: PCT/CN2017/074254
§ 371 (c)(1),
(2) Date: Aug. 21, 2018

(87) PCT Pub. No.: WO2017/143963
PCT Pub. Date: Aug. 31, 2017

(65) Prior Publication Data
US 2019/0068977 A1 Feb. 28, 2019

(30) Foreign Application Priority Data
Feb. 22, 2016 (WO) ............... PCT/CN2016/074200

(51) Int. Cl.
*H04N 19/159* (2014.01)
*H04N 19/176* (2014.01)
(Continued)

(52) U.S. Cl.
CPC ........... *H04N 19/159* (2014.11); *H04N 19/11* (2014.11); *H04N 19/119* (2014.11);
(Continued)

(58) Field of Classification Search
CPC .... H04N 19/159; H04N 19/186; H04N 19/11; H04N 19/119; H04N 19/139; H04N 19/176; H04N 19/61
See application file for complete search history.

(56) References Cited

U.S. PATENT DOCUMENTS 9,426,472 B2 * 8/2016 Kim .................... H04N 19/172
2015/0373327 A1 12/2015 Zhang et al.

FOREIGN PATENT DOCUMENTS

| CN | 1784015 A | 6/2006 |
| CN | 102843555 A | 12/2012 |

(Continued)

OTHER PUBLICATIONS

International Search Report dated Nov. 10, 2016, issued in application No. PCT/CN2016/074200.
(Continued)

*Primary Examiner* — Sath V Perungavoor
*Assistant Examiner* — Tyler B Edwards
(74) *Attorney, Agent, or Firm* — McClure, Qualey & Rodack, LLP (57) ABSTRACT

A method and apparatus of Inter/Intra prediction for a chroma component performed by a video encoder or video decoder are disclosed. According to this method, a current chroma prediction block (e.g. a prediction unit, PU) is divided into multiple chroma prediction sub-blocks (e.g. sub-PUs). A corresponding luma prediction block is identified for each chroma prediction sub-block. A chroma prediction mode for each chroma prediction sub-block is determined from a luma prediction mode associated with the
(Continued)

corresponding luma prediction block. A local chroma predictor for the current chroma prediction block is generated by applying a prediction process to the multiple chroma prediction sub-blocks using respective chroma prediction modes. In other words, the prediction process is applied at the chroma prediction sub-block level. After the local chroma predictor is derived, a coding block associated with the current chroma prediction block is encoded or decoded using information comprising the local chroma predictor.

18 Claims, 7 Drawing Sheets

(51) Int. Cl.
*H04N 19/119* (2014.01)
*H04N 19/186* (2014.01)
*H04N 19/11* (2014.01)
*H04N 19/139* (2014.01)
*H04N 19/61* (2014.01)

(52) U.S. Cl.
CPC ......... *H04N 19/176* (2014.11); *H04N 19/186* (2014.11); *H04N 19/139* (2014.11); *H04N 19/61* (2014.11)

(56) References Cited

FOREIGN PATENT DOCUMENTS

| | | |
|---|---|---|
| CN | 102857768 A | 1/2013 |
| CN | 103314588 A | 9/2013 |
| CN | 104581181 A | 4/2015 |
| EP | 2 739 058 A2 | 6/2014 |
| WO | 2015/078304 A1 | 6/2015 |
| WO | WO-2015078304 A1 * | 6/2015 ........... H04N 19/122 |

OTHER PUBLICATIONS

International Search Report dated May 17, 2017, issued in application No. PCT/CN2017/074254.

* cited by examiner

METHOD AND APPARATUS OF LOCALIZED LUMA PREDICTION MODE INHERITANCE FOR CHROMA PREDICTION IN VIDEO CODING

CROSS REFERENCE TO RELATED APPLICATIONS

The present invention claims priority to PCT Patent Application, Serial No. PCT/CN2016/074200, filed on Feb. 22, 2016. The PCT Patent Applications is hereby incorporated by reference in its entirety.

TECHNICAL FIELD

The invention relates generally to video coding. In particular, the present invention relates to chroma prediction using localized luma prediction mode inheritance.

BACKGROUND

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC).

In HEVC, one slice is partitioned into multiple coding tree units (CTU). The CTU is further partitioned into multiple coding units (CUs) to adapt to various local characteristics. Coding mode, such as Inter mode or Intra, is selected on a CU basis. HEVC supports multiple Intra prediction modes and for Intra coded CU, the selected Intra prediction mode is signalled. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. After prediction, the residues associated with the CU are partitioned into transform blocks, named transform units (TUs) for the transform process.

Figure 1:
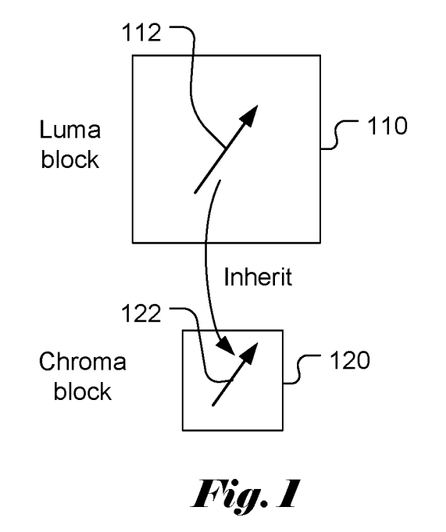
FIG. 1 illustrates an example of 'DM' mode for a chroma block according to HEVC (High Efficiency Video Coding), where a chroma block inherits the same Intra prediction coding mode of the corresponding luma block.

HEVC uses more sophisticated Intra prediction than previous video coding standards such as AVC/H.264. According to HEVC, 35 Intra prediction modes are used for the luma components, where the 35 Intra prediction modes include DC, planar and various angular prediction modes. There is chroma Intra prediction mode referred as 'DM' mode, in which a chroma block will inherit the same Intra prediction coding mode of the corresponding luma block as depicted FIG. 1. In FIG. 1, block 120 represents a chroma block and block 110 represents a corresponding luma block. In this example, the luma block 110 has an angular prediction mode as indicated by arrow 112. According to the DM mode, the chroma block 120 inherits the prediction mode (i.e., the angular prediction mode in this example) from the luma block 110. In other words, the Intra prediction mode 122 for the chroma block 120 is the same as the Intra prediction mode 112 for the luma block 110.

The design in HEVC is suitable only when luma and chroma components share the same coding structure. When luma and chroma coding structure is separated, the DM mode may be not suitable. In the existing HEVC standard, the prediction mode of a chroma block (i.e., a chroma PU) may inherit the prediction mode of a corresponding block (i.e., a luma PU). The prediction mode inheritance is performed on a chroma PU basis. In advanced coding system, the coding structure may be different for luma and chroma components. When a large chroma PU is used, the prediction mode inherited from a corresponding luma block (i.e., luma PU) may not be suitable for the large chroma PU. Accordingly, a technique, named localized luma prediction mode inheritance (LLMI) is disclosed in the present invention in order to provide better prediction modes for the chroma PU and consequently to result in improved compression performance.

SUMMARY

A method and apparatus of Inter/Intra prediction for a chroma component performed by a video encoder or video decoder are disclosed. According to this method, a current chroma prediction block (e.g. a prediction unit, PU) is divided into multiple chroma prediction sub-blocks (e.g. sub-PUs). A corresponding luma prediction block is identified for each chroma prediction sub-block. A chroma prediction mode for each chroma prediction sub-block is determined from a luma prediction mode associated with the corresponding luma prediction block. A local chroma predictor for the current chroma prediction block is generated by applying a prediction process to the multiple chroma prediction sub-blocks using respective chroma prediction modes. In other words, the prediction process is applied at the chroma prediction sub-block level. After the local chroma predictor is derived, a coding block associated with the current chroma prediction block is encoded or decoded using information comprising the local chroma predictor.

The chroma prediction mode and the luma prediction mode may correspond to an Intra prediction mode. The chroma prediction mode and the luma prediction mode may also correspond to an Inter prediction mode. Parameters associated with the Inter prediction mode belong to a motion information group comprising motion vector, reference picture index, prediction direction representing uni-prediction or bi-prediction, and merge index.

Transform block structure may use the same structure as the chroma prediction block so that each chroma prediction sub-block can be treated as a transform sub-block and a transform process is applied to each chroma prediction residual sub-block to generate each transform sub-block. When a first chroma prediction sub-block is processed before a second chroma prediction sub-block, a reconstructed first chroma prediction sub-block can be used for the prediction process of the second chroma prediction sub-block, where the reconstructed first chroma prediction sub-block is generated from a reconstructed first chroma prediction residual sub-block corresponding to a reconstructed transform sub-block. When a first chroma prediction sub-block is processed before a second chroma prediction sub-block, the chroma prediction mode or chroma predictor of the first chroma prediction sub-block can also be used for the prediction process of the second chroma prediction sub-block.

In another embodiment, a second chroma predictor is derived by applying a different prediction process having a second prediction mode to the current chroma prediction block. A combined chroma predictor is then generated based on the local chroma predictor and the second chroma predictor. The combined chroma predictor is then used for or decoding the current chroma prediction block. The combined chroma predictor may correspond to a weighted sum of the local chroma predictor and the second chroma predictor. In yet another embodiment, the combined chroma predictor, $P(i,j)$ is derived from the local chroma predictor, $P^L(i,j)$ and the second chroma predictor, $P^K(i,j)$, according to $P(i,j)=(w1*P^L(i,j)+w2*P^K(i,j)+D)>>S$, wherein w1, w2, D and S are integers, S is greater than zero, w1+w2=1<<S, ">>" corresponds to a right-shift operation and "<<" corresponds to a left-shift operation. For example, D can be equal to zero or 1<<(S−1). In another example, w1, w2, and D are zero, and S is equal to one. In another example, w1 and w2 are zero, and D and S are equal to one.

The second prediction mode may belong to a mode group comprising one or more of LM mode, LM_TOP mode, LM_LEFT mode, LM_TOP_RIGHT mode, LM_RIGHT mode, LM_LEFT_BOTTOM mode, LM_BOTTOM mode, LM_LEFT_TOP mode, and LM_CbCr mode. The second prediction mode may correspond to an angular prediction mode. The second prediction mode may also belong to a mode group comprising DC mode, Planar mode, Planar_Ver mode and Planar_Hor mode.

A localized luma prediction mode inheritance (LLMI) mode indicating a use of the local chroma predictor for encoding or decoding the current chroma prediction block can be coded by placing the LLMI mode in a code table among other prediction modes, and the LLMI mode is placed at a first position in the code table so that the LLMI mode has a shortest codeword. In another example, the LLMI mode is placed after LM and extended LM modes in the code table so that the LLMI mode has a longer codeword than codewords associated with the LM and extended LM modes. In yet another example, the LLMI mode is placed after LM Fusion mode and extended LM Fusion modes in the code table so that the LLMI mode has a longer codeword than codewords associated with the LM Fusion mode and extended LM Fusion modes.

According to another method of the present invention, each sub-block is predicted as a part of the prediction block of the current chroma block. For example, a current chroma prediction block is divided into multiple chroma prediction sub-blocks comprising at least a first chroma prediction sub-block and a second chroma prediction sub-block. A first chroma prediction mode is applied to the current chroma prediction block to generate a first predictor for the current chroma prediction block. A second chroma prediction mode is applied to the current chroma prediction block to generate a second predictor for the current chroma prediction block. A local chroma predictor is generated for the current chroma prediction block, where the local chroma predictor comprises a first sub-block predictor corresponding to the first chroma prediction sub-block of the first predictor and a second sub-block predictor corresponding to the second chroma prediction sub-block of the second predictor. A chroma coding block associated with the current chroma prediction block is encoded using information comprising the local chroma predictor at the encoder side or a chroma coding block associated with the current chroma prediction block is decoded using information comprising the local chroma predictor at the decoder side.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

In the following description, Y component is identical to the luma component, U component is identical to Cb component and V component is identical to Cr component.

In the present invention, Localized Luma Prediction Mode Inheritance (LLMI) for chroma prediction and/or coding is disclosed. In one embodiment, a current chroma block with size SxR is divided into multiple sub-blocks with the size PxQ. For example, an 8×8 chroma block can be divided into 16 sub-blocks with a block size of 2×2. For a sub-block C in the current chroma block, the corresponding luma block L can be found. The luma prediction mode M of the corresponding luma block L can be obtained and mode M is assigned to the sub-block C in the current chroma block. In a conventional video coding system, such as the High Efficiency Video Coding (HEVC), a prediction mode is applied to each chroma block (e.g. a chroma prediction unit, PU). The present invention discloses a process to divide a chroma prediction block into multiple chroma prediction sub-blocks. Therefore, each chroma prediction sub-block may use its own prediction mode that may match the local characteristics of each individual chroma prediction sub-block. Subsequently, this LLMI prediction process may result in improved coding performance.

The term 'prediction mode' can refer to Intra prediction modes, such as various angular modes and other modes used in HEVC. It can also refer to Inter prediction modes. In this case, when a chroma sub-block inherits the prediction mode of a corresponding luma block, it implies that the chroma sub-block inherits the motion information or parameters associated with the Inter prediction mode, such as, but not limited to, motion vector, reference picture, prediction direction to identify uni-prediction or bi-prediction and merge index. In the following descriptions, an example of LLMI for the Intra prediction modes is illustrated.

Figure 2:
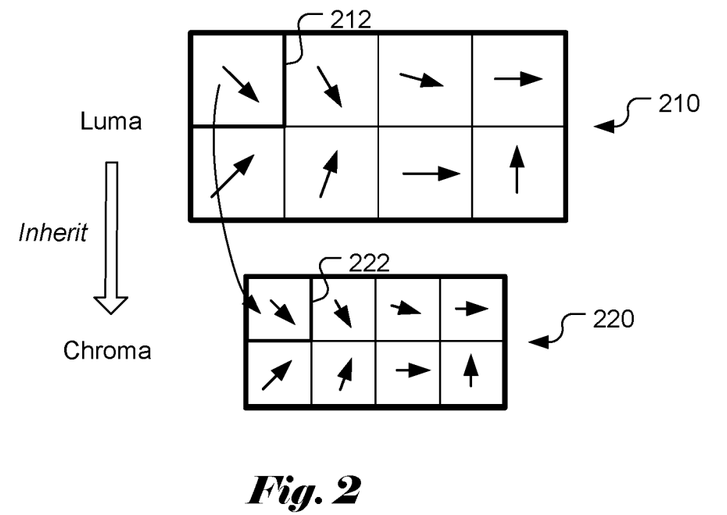
FIG. 2 illustrates an example of Localized Luma Prediction Mode Inheritance (LLMI) according to an embodiment of the present invention, where an 8×4 chroma block is divided into 8 sub-blocks with a block size of 2×2 as represented as each square block.

FIG. 2 illustrates an example of localized luma prediction mode inheritance. In this example, the 8×4 chroma block 220 would use a single prediction mode for the whole 8×4 chroma block 220. However, according to an embodiment of the present invention, the 8×4 chroma block 220 (as indicated by a rectangle in bold line) is divided into 8 sub-blocks with a block size of 2×2 as represented as each square block in FIG. 2. The corresponding luma block 210 (as indicated by a rectangle in bold line) is 16×8, where 4:2:0 chroma subsampling is implied. The prediction modes (as indicated by the arrows) for the luma block are stored for each 4×4 block. Therefore, for each 2×2 sub-block in the current chroma block (e.g. sub-block 222), a corresponding 4×4 luma block can be identified (e.g. sub-block 212). Each 4×4 luma block has a prediction mode (such as an angular mode for Intra prediction as indicated by an arrow in FIG. 2), which is then assigned as the prediction mode of its corresponding chroma sub-block. For example, the prediction mode of chroma sub-block 222 is inherited from the prediction mode of the corresponding luma sub-block 212. In a conventional coding system, only one prediction mode can be used for the whole 8×4 chroma block 220. Accordingly, the prediction process according to the present invention allows prediction mode to adapt to local characteristics at a sub-block level.

Figure 3:
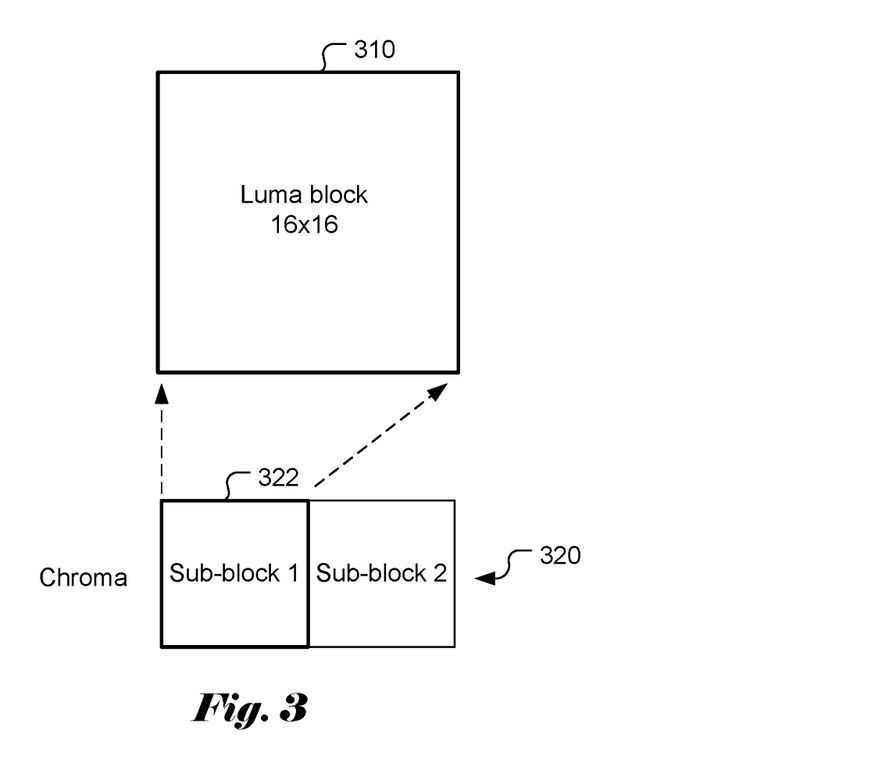
FIG. 3 illustrates an example according to an embodiment of the present invention, where the 16×8 chroma block is divided into two sub-blocks, each having a block size of 8×8 and for each 8×8 sub-block in the current chroma block, a corresponding 16×16 luma block is identified.
Figure 4:
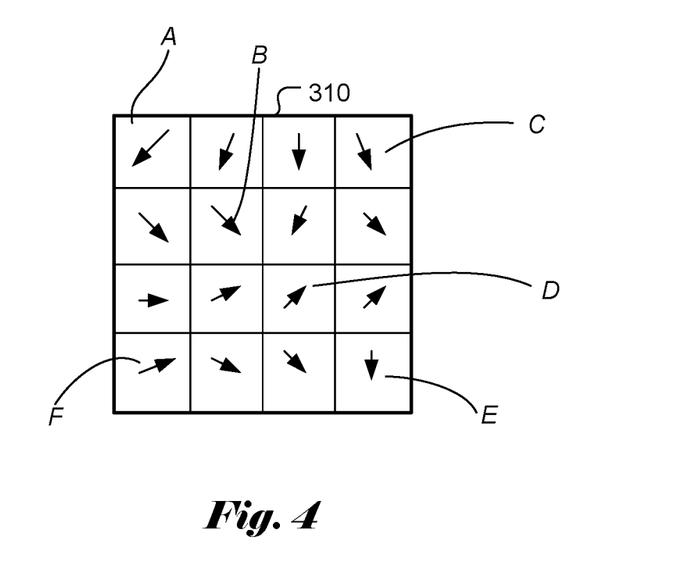
FIG. 4 illustrates an example according to an embodiment of the present invention, where the 16×16 luma block has 16 prediction modes in its sixteen 4×4 luma blocks and one of the 16 prediction modes is chosen to assign to its corresponding chroma sub-block.

In the example of FIG. 2, each chroma sub-block has one corresponding luma block that is associated with one prediction mode. However, in some cases, the corresponding luma block may have more than one prediction mode. According to one embodiment of the present invention, if the corresponding luma block has more than one prediction modes, one of these modes can be selected and assigned to the corresponding chroma sub-block. FIG. 3 illustrates an example of mode inheritance according to this embodiment. In this example, the chroma block 320 is 16×8, which is divided into two sub-blocks, each with a block size of 8×8. For each 8×8 sub-block (e.g. sub-block 322) in the current chroma block 320, it corresponds to a 16×16 luma block 310. A 16×16 luma block has 16 prediction modes in its sixteen 4×4 luma blocks as shown in FIG. 4. One of these 16 modes is then chosen to assign to its corresponding chroma sub-block (e.g. sub-block 322). For example, the prediction mode of luma 4×4 sub-block at the upper-left corner (i.e., block A) can be chosen. However, the modes in other blocks such as block B, C, D, E or F may also be chosen.

Figure 5:
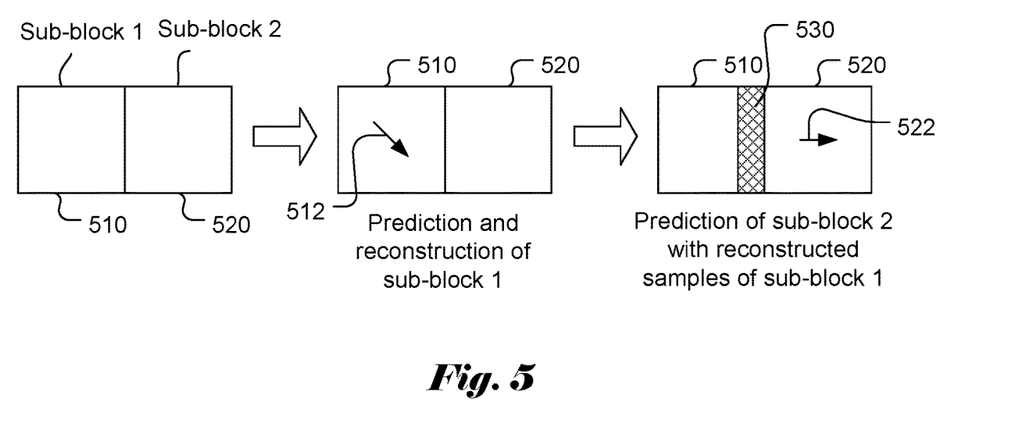
FIG. 5 illustrates an example according to an embodiment of the present invention, where each sub-block corresponds to a transform unit (TU). The sub-blocks are processed in scanning order and the reconstructed samples of a previous chroma sub-block can be used for predicting a current chroma sub-block.

The block structure for LLMI process may also be applied to the transform structure. In one embodiment, each sub-block corresponds to a transform unit (TU) in HEVC. The sub-blocks are processed in scanning order across the sub-blocks. At decoder, after one sub-block is predicted and reconstructed, the reconstructed samples of this sub-block will be used to predict following sub-blocks. FIG. 5 illustrates an example of localized prediction mode inheritance according to this embodiment. In this example, the current 8×4 block is divided into two 4×4 sub-blocks. Sub-block 1 (510) is assigned with prediction mode 1 as indicated by arrow 512 and sub-block 2 (520) is assigned with prediction mode 2 as indicated by arrow 522. Sub-block 1(510) is first predicted as a 4×4 block with prediction mode 1, and then sub-block 1(510) is reconstructed. The reconstructed samples (530) of sub-block 1 (510) is used for predicting sub-block 2 (520) with prediction mode 2, and sub-block 2 is then reconstructed.

Figure 6:
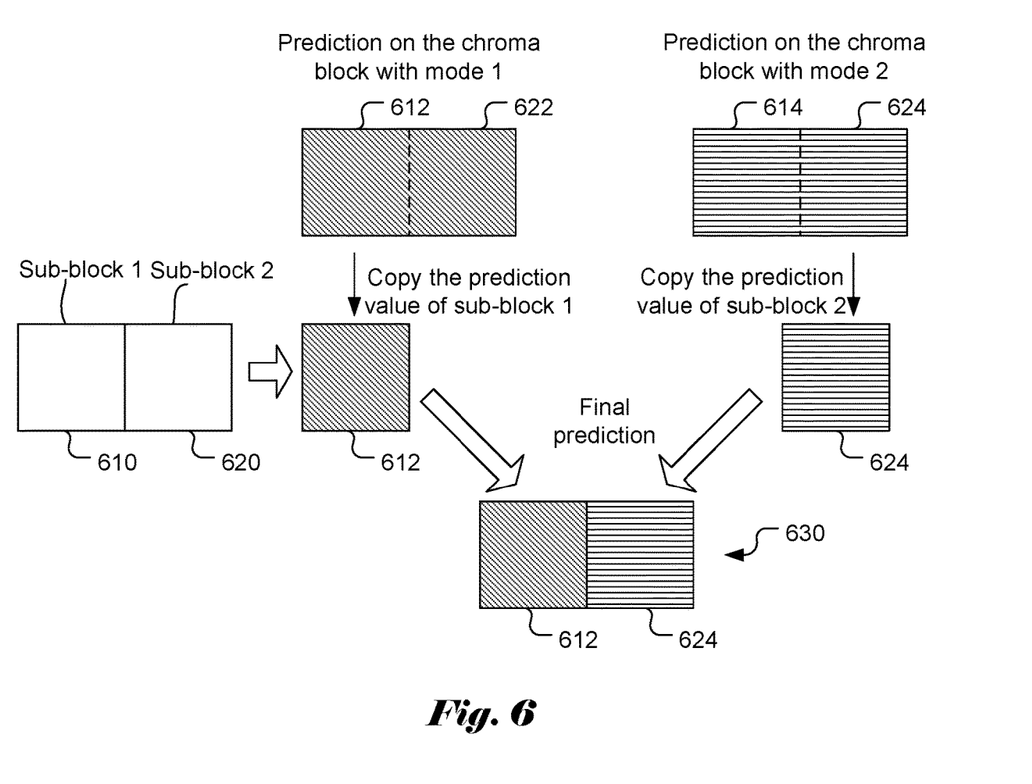
FIG. 6 illustrates an example according to an embodiment of the present invention, where two different prediction modes are applied to a chroma block and two different sub-blocks predicted by two different prediction modes are selected.

In another embodiment, each sub-block is predicted as a part of the prediction block of the current chroma block. FIG. 6 illustrates an example according to this embodiment. In this example, the current 8×4 block is divided into two sub-blocks (610 and 620) and each sub-block is 4×4. Sub-block 1 (610) is assigned with prediction mode 1 and sub-block 2 (620) is assigned with prediction mode 2. The current block will be predicted as an 8×4 block with mode 1 (i.e., prediction samples for sub-blocks 612 and 622), and sub-block 1 (612) will use the predictions of left 4×4 part. The current block will also be predicted as an 8×4 block with mode 2 (i.e., prediction samples for sub-blocks 614 and 624), and sub-block 2 (624) will also use the prediction samples of right 4×4 part. The final prediction samples for block 630 has its sub-block 1 (612) predicted using prediction mode 1 and sub-block 2 (624) predicted using prediction mode 2.

Figure 7:
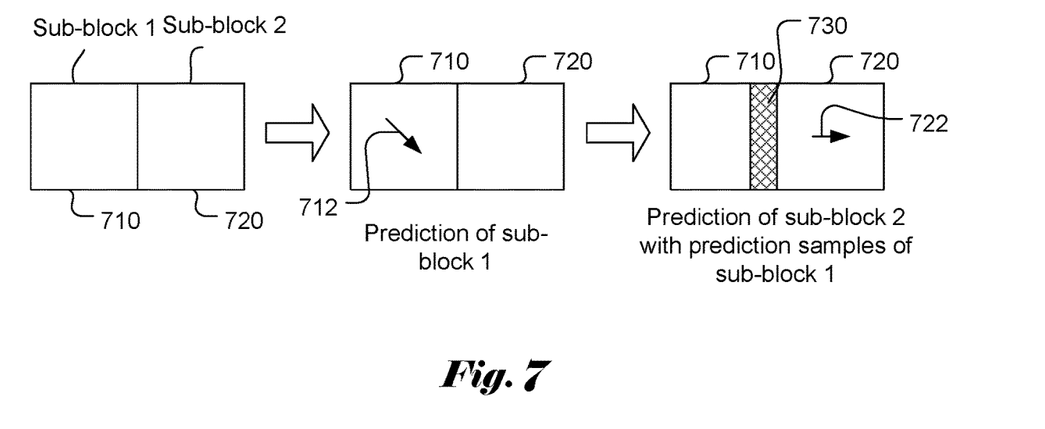
FIG. 7 illustrates an example according to an embodiment of the present invention, where the prediction samples of a previous chroma sub-block can be used for predicting a current chroma sub-block.

In another embodiment, each sub-block is predicted in a cascade way. FIG. 7 illustrates an example according to this embodiment. In this example, the current 8×4 block is divided into two 4×4 sub-blocks (710 and 720). Sub-block 1 (710) is assigned with prediction mode 1 as indicated by arrow 712 and sub-block 2 (720) is assigned with prediction mode 2 as indicated by arrow 722. Sub-block 1 (710) is first predicted as a 4×4 block with prediction mode 1. With the predicted samples (730) of sub-block 1 (710) as part of reference samples, sub-block 2 (720) is predicted as a 4×4 block with prediction mode 2.

In another embodiment, LLMI mode can be fused with other modes. For example, a chroma block can be first predicted by the proposed LLMI mode. For a sample (i,j) in this block, its prediction value with LLMI mode is represented as $P^L(i,j)$. The chroma block is then predicted by another prediction mode, such as mode K that is different from the LLMI mode. For a sample (i,j) in this block, its prediction value with mode K is represented as $P^K(i,j)$. The combined prediction for sample (i,j) denoted as P (i,j) in this block is calculated as:

$$P(i,j)=w1*P^L(i,j)+w2*P^K(i,j), \qquad (1)$$

where w1 and w2 are weighting values (real number) and w1+w2=1. In equation (1), the combined prediction is derived as a weighted sum of LLMI prediction value and another prediction value.

In another example, the combined prediction for sample (i,j) denoted as P (i,j) in this block is calculated as:

$$P(i,j)=(w1*P^L(i,j)+w2*P^K(i,j)+D)>>S, \qquad (2)$$

where w1, w2, D and S are integers, S>=1, and w1+w2=1<<S. For example, D can be 0. In another example, D is 1<<(S−1). The symbols ">>" and "<<" represent right-shift and left-shift operations respectively.

In yet another example, the combined prediction for sample (i,j) denoted as P (i,j) in this block is calculated as:

$$P(i,j)=(P^L(i,j)+P^K(i,j)+1)>>1. \quad (3)$$

In yet another example, the combined prediction for sample (i,j) denoted as P (i,j) in this block is calculated as:

$$P(i,j)=(P^L(i,j)+P^K(i,j))>>1. \quad (4)$$

Any mode can be used as mode K as long as it is not LLMI mode. For example, mode K may correspond to LM mode, LM_TOP mode, LM_LEFT mode, LM_TOP_RIGHT mode, LM_RIGHT mode, LM_LEFT_BOTTOM mode, LM_BOTTOM mode, LM_LEFT_TOP mode or LM_CbCr mode.

In one embodiment, mode K can be any angular prediction mode with a prediction direction. In another embodiment, mode K can be any of DC mode, Planar mode, Planar_Ver mode and Planar_Hor mode.

In a video coding system, the prediction mode selected for a block may have to be signalled in the bitstream. Usually, a codeword is signalled to indicate a selected prediction mode among a list of possible prediction modes. In one embodiment, in order to code the chroma mode, the LLMI mode is put into the code table at the first position, i.e., LLMImode requires a codeword no longer than any other chroma intra prediction modes. In other words, the LLMI mode has the shortest codeword.

Figure 8:
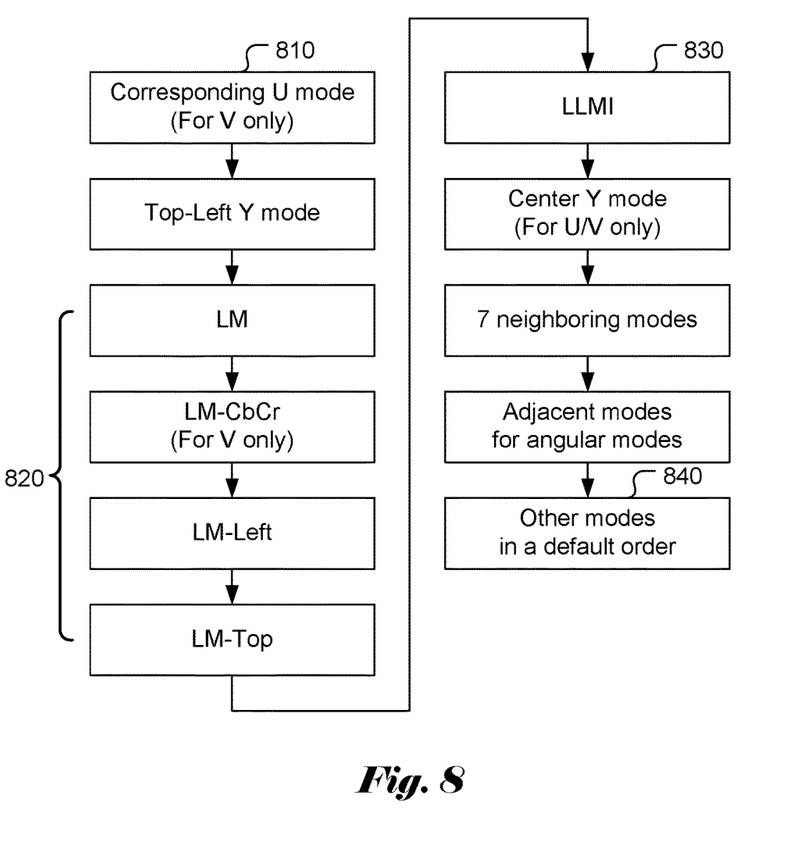
FIG. 8 illustrates an example of code table order according to an embodiment of the present invention, where the LLMI (Localized Luma Prediction Mode Inheritance) mode is placed after the four LM and its extended modes.

To code the chroma mode, LLMImode can also be placed into the code table at a location after the LM and its extended modes. In this case, the LLMImode requires a codeword no shorter than the LM and its extended modes. An example of code table order is demonstrated in FIG. 8, where the "Corresponding U mode (For V only)" mode 810 is inserted into the beginning location of the code table and "Other modes in a default order" 840 is inserted at the end of the code table. As shown in FIG. 8, the LLMI mode 830 is placed after the four LM and its extended modes 820.

Figure 9:
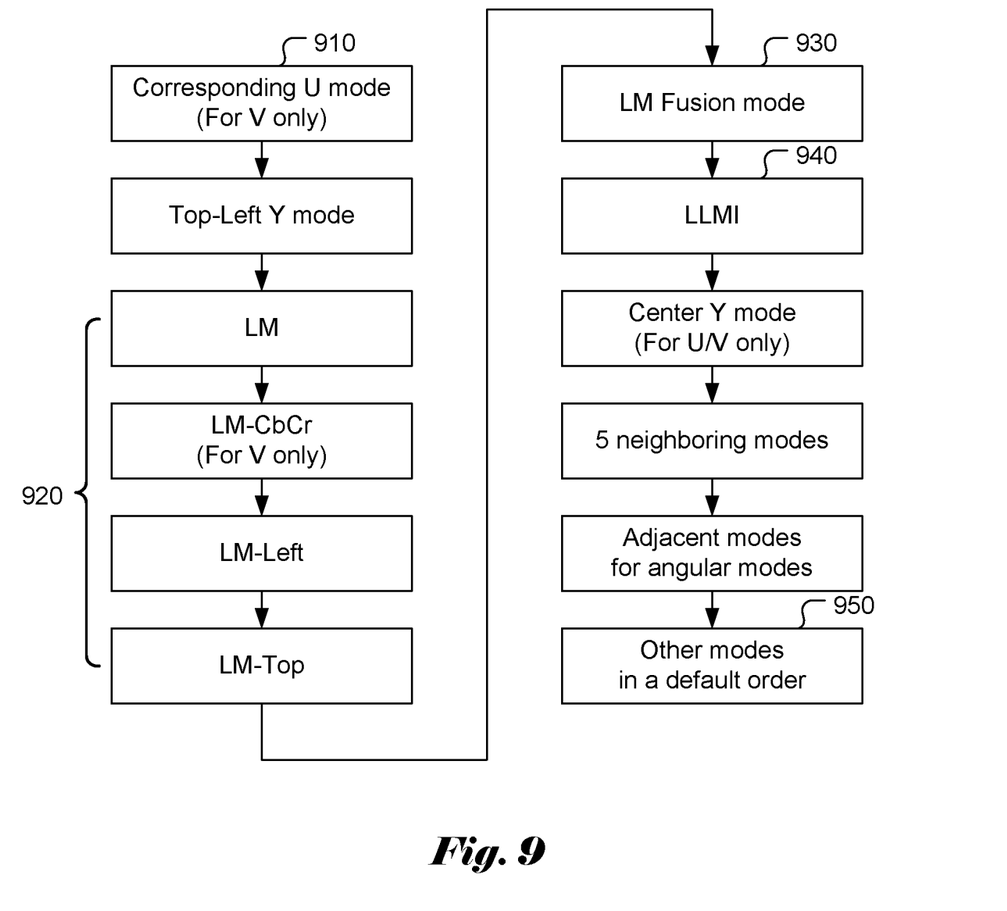
FIG. 9 illustrates an example of code table order according to an embodiment of the present invention, where the LLMI (Localized Luma Prediction Mode Inheritance) mode is placed after the four LM and its extended modes, and LM Fusion mode.

To code the chroma mode, LLMImode is put into the code table after LM Fusion mode and its extended modes, i.e., LLMImode requires a codeword no less than LM Fusion mode and its extended modes. An example code table order is demonstrated in FIG. 9, where the "Corresponding U mode (For V only)" mode 910 is inserted into the beginning location of the code table and "Other modes in a default order" 950 is inserted at the end of the code table. As shown in FIG. 9, the LLMI mode 940 is placed after the four LM and its extended modes 920 and LM Fusion mode 930.

Figure 10:
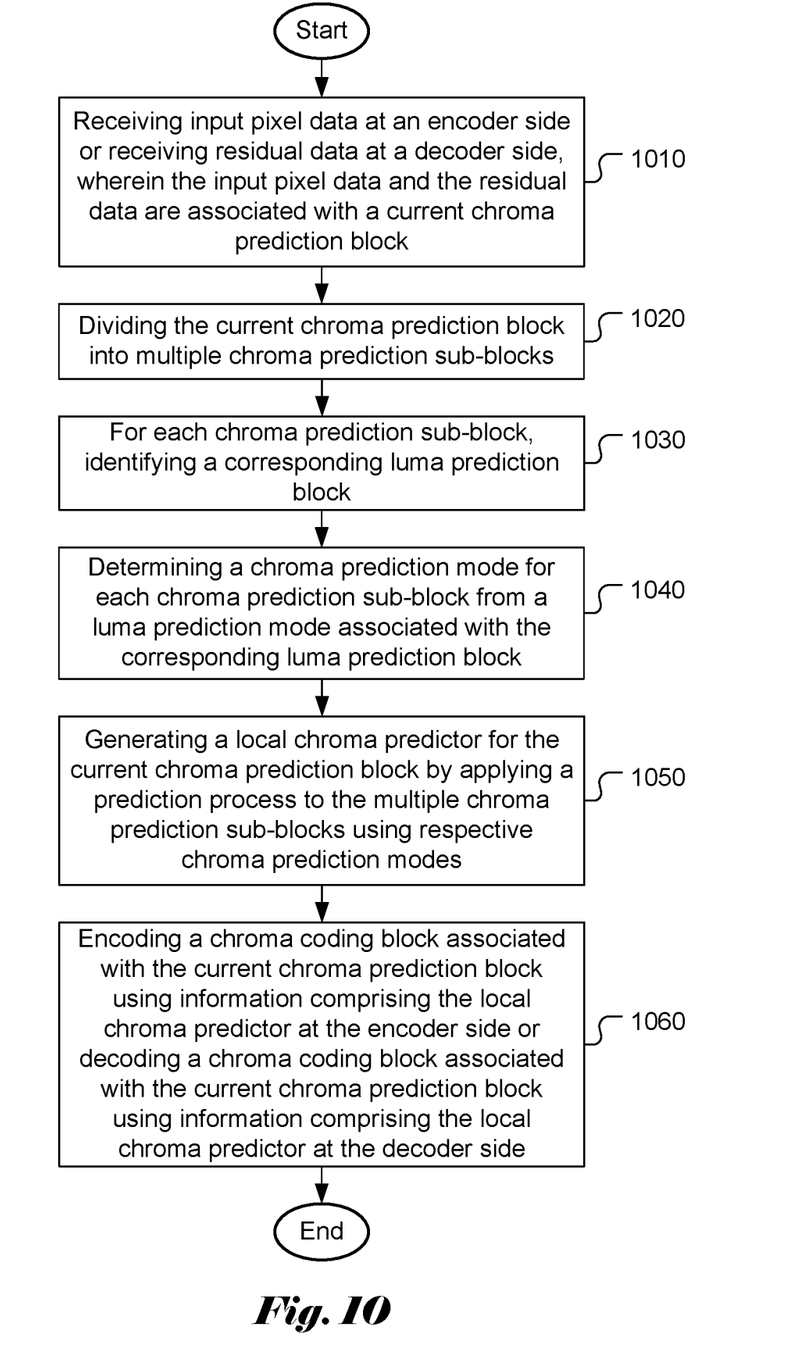
FIG. 10 illustrates an exemplary flowchart for a coding system incorporating LLMI (Localized Luma Prediction Mode Inheritance) mode according to an embodiment of the present invention.

FIG. 10 illustrates an exemplary flowchart for a coding system incorporating LLMI (Localized Luma Prediction Mode Inheritance) mode according to an embodiment of the present invention. The steps shown in the flowchart may be implemented as program codes executable on one or more processors (e.g., one or more CPUs) at the server side and/or the client side. The steps shown in the flowchart may also be implemented based hardware such as one or more electronic devices or processors arranged to perform the steps in the flowchart. According to this method, input pixel data are received at an encoder side or residual data are received at a decoder side in step 1010, where the input pixel data and the residual data are associated with a current chroma prediction block. The current chroma prediction block is divided into multiple chroma prediction sub-blocks in step 1020. For each chroma prediction sub-block, a corresponding luma prediction block is identified in step 1030. A chroma prediction mode is determined for each chroma prediction sub-block from a luma prediction mode associated with the corresponding luma prediction block in step 1040. A local chroma predictor is generated for the current chroma prediction block by applying a prediction process to the multiple chroma prediction sub-blocks using respective chroma prediction modes in step 1050. As is known in the field, the predictor is generated using previously coded data. For Intra prediction, prediction samples or reconstructed sample from previously processed neighbouring sub-block (s) are used to generate the predictor. For Inter prediction, reconstructed sample from sub-block(s) in a reference picture are used to generate the predictor. The chroma coding block associated with the current chroma prediction block is encoded at the encoder side or decoded at the decoder side using information comprising the local chroma predictor in step 1060. As is known in the field, the prediction block(s) within a coding block will generate prediction residuals for the coding block. The prediction residuals for the coding block may be divided into transform block(s) and each transform block is further processed by transform process. The transform coefficients of each transform block are subject to further quantization process and entropy coding process. The transform coefficients of each transform block can be reconstructed by entropy decoding process and inverse quantization process. The reconstructed prediction residuals can be determined from the reconstructed transform blocks. The reconstructed prediction residuals for the coding block are used for reconstructing the coding unit.

Figure 11:
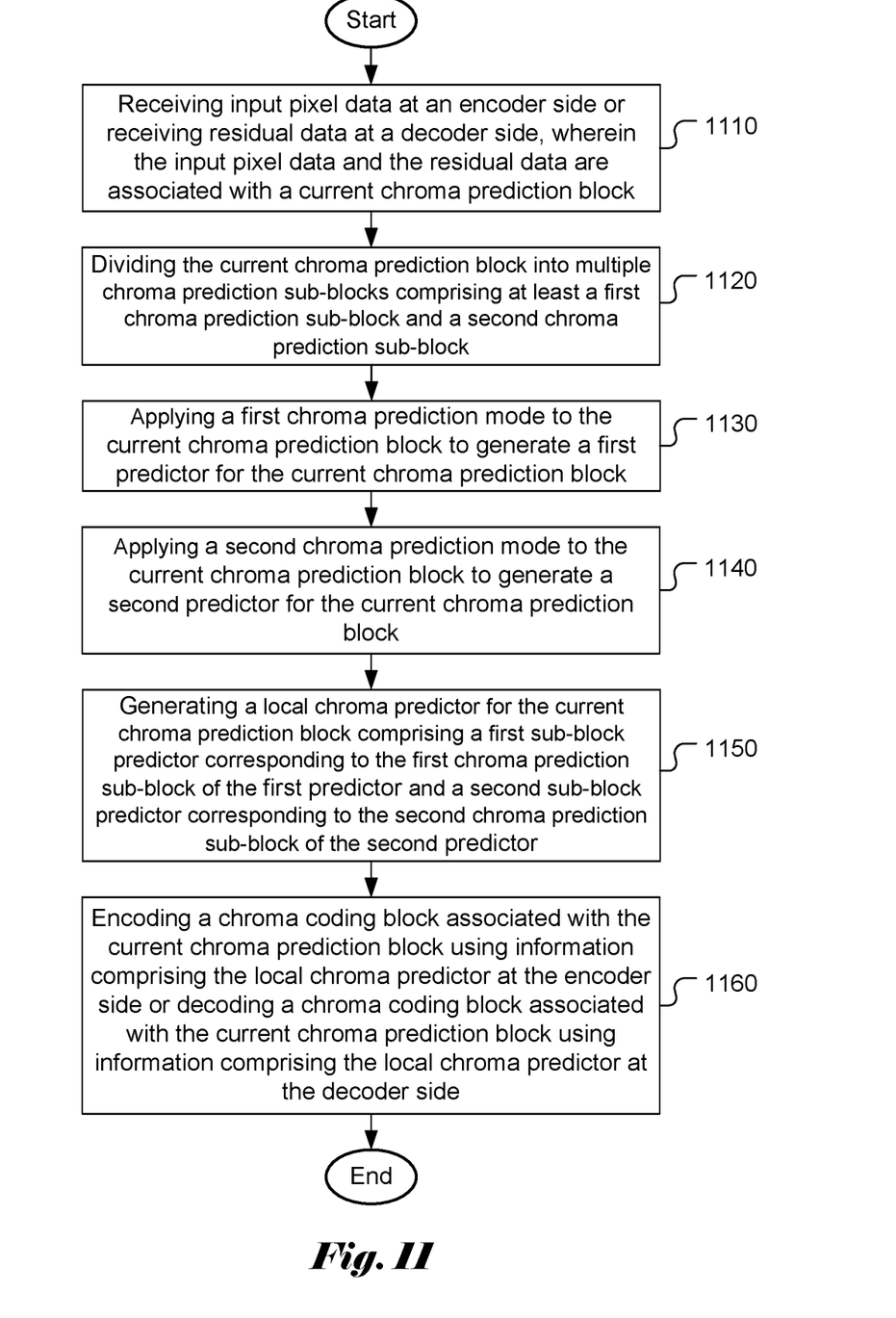
FIG. 11 illustrates an exemplary flowchart for another coding system incorporating localized prediction mode according to an embodiment of the present invention.

FIG. 11 illustrates an exemplary flowchart for another coding system incorporating localized prediction mode according to an embodiment of the present invention. The steps shown in the flowchart may be implemented as program codes executable on one or more processors (e.g., one or more CPUs) at the server side and/or the client side. The steps shown in the flowchart may also be implemented based hardware such as one or more electronic devices or processors arranged to perform the steps in the flowchart. According to this method, input pixel data are received at an encoder side or residual data are received at a decoder side in step 1110, where the input pixel data and the residual data are associated with a current chroma prediction block. The current chroma prediction block is divided into multiple chroma prediction sub-blocks comprising at least a first chroma prediction sub-block and a second chroma prediction sub-block in step 1120. A first chroma prediction mode is applied to the current chroma prediction block to generate a first predictor for the current chroma prediction block in step 1130. A second chroma prediction mode is applied to the current chroma prediction block to generate a second predictor for the current chroma prediction block in step 1140. A local chroma predictor is generated for the current chroma prediction block in step 1150, where the local chroma predictor comprises a first sub-block predictor corresponding to the first chroma prediction sub-block of the first predictor and a second sub-block predictor corresponding to the second chroma prediction sub-block of the second predictor. The chroma coding block associated with the current chroma prediction block is encoded at the encoder side or decoded at the decoder side using information comprising the local chroma predictor in step 1160. As is known in the field, the prediction block(s) within a coding block will generate prediction residuals for the coding block. The prediction residuals for the coding block may be divided into transform block(s) and each transform block is further processed by transform process. The transform coefficients of each transform block are subject to further quantization process and entropy coding process. The transform coefficients of each transform block can be reconstructed by entropy decoding process and inverse quantization process.

The reconstructed prediction residuals can be determined from the reconstructed transform blocks. The reconstructed prediction residuals for the coding block are used for reconstructing the coding unit.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of Inter/Intra prediction for a chroma component performed by a video encoder or video decoder, the method comprising:

receiving input pixel data at an encoder side or receiving residual data at a decoder side, wherein the input pixel data and the residual data are associated with a current chroma prediction block;

dividing the current chroma prediction block into multiple chroma prediction sub-blocks;

for each chroma prediction sub-block, identifying a corresponding luma prediction block;

determining a chroma prediction mode for each chroma prediction sub-block from a luma prediction mode associated with the corresponding luma prediction block;

generating a local chroma predictor for the current chroma prediction block by applying a prediction process to the multiple chroma prediction sub-blocks using respective chroma prediction modes;

encoding a chroma coding block associated with the current chroma prediction block using information comprising the local chroma predictor at the encoder side or decoding a chroma coding block associated with the current chroma prediction block using information comprising the local chroma predictor at the decoder side; and applying a different prediction process to a current chroma prediction block to generate a second chroma predictor and generating a combined chroma predictor based on the local chroma predictor and the second chroma predictor, and wherein said encoding the current chroma prediction block using the combined chroma predictor at the encoder side or decoding the current chroma prediction block using the combined chroma predictor at the decoder side.

2. The method of claim 1, wherein each chroma prediction mode and each luma prediction mode correspond to an Intra prediction mode.

3. The method of claim 1, wherein each chroma prediction mode and each luma prediction mode correspond to an Inter prediction mode.

4. The method of claim 3, wherein parameters associated with the Inter prediction mode belong to a motion information group comprising motion vector, reference picture index, prediction direction representing uni-prediction or bi-prediction, and merge index.

5. The method of claim 1, wherein a transform block structure uses same structure as the current chroma prediction block so that each chroma prediction sub-block is treated as a transform sub-block and a transform process is applied to each chroma prediction residual sub-block to generate each transform sub-block.

6. The method of claim 5, wherein when a first chroma prediction sub-block is processed before a second chroma prediction sub-block, a reconstructed first chroma prediction sub-block is used for the prediction process of the second chroma prediction sub-block, wherein the reconstructed first chroma prediction sub-block is generated from a reconstructed first chroma prediction residual sub-block corresponding to a reconstructed transform sub-block.

7. The method of claim 1, wherein the combined chroma predictor corresponds to a weighted sum of the local chroma predictor and the second chroma predictor.

8. The method of claim 1, wherein the combined chroma predictor, $P(i,j)$ is derived from the local chroma predictor, $PL(i,j)$ and the second chroma predictor, $PK(i,j)$, according to $P(i,j)=(w1*PL(i,j)+w2*PK(ij)+D)>>S$, wherein w1, w2, D and S are integers, S is greater than zero, $w1+w2=1<<S$, ">>" corresponds to a right-shift operation and "<<" corresponds to a left-shift operation.

9. The method of claim 8, wherein D is equal to zero or $1<<(S-1)$.

10. The method of claim 1, wherein the second prediction mode belongs to a mode group comprising one or more of LM mode, LM_TOP mode, LM_LEFT mode, LM_TOP_RIGHT mode, LM_RIGHT mode, LM_LEFT_BOTTOM mode, LM_BOTTOM mode, LM_LEFT_TOP mode, and LM_CbCr mode.

11. The method of claim 1, wherein the second prediction mode corresponds to an angular prediction mode.

12. The method of claim 1, wherein the second prediction mode belongs to a mode group comprising DC mode, Planarmode, Planar_Ver mode and Planar_Hor mode.

13. The method of claim 1, wherein a localized luma prediction mode inheritance (LLMI) mode indicating a use of the local chroma predictor for encoding or decoding the current chroma prediction block is coded by placing the LLMI mode in a code table among other prediction modes, and wherein the LLMI mode is placed at a first position in the code table so that the LLMI mode has a shortest codeword.

14. The method of claim 1, wherein a localized luma prediction mode inheritance (LLMI) mode indicating a use of the local chroma predictor for encoding or decoding the current chroma prediction block is coded by placing the LLMI mode in a code table among other prediction modes, and wherein the LLMI mode is placed after LM and extended LM modes in the code table so that the LLMI mode has a longer codeword than codewords associated with the LM and extended LM modes.

15. An apparatus of Inter/Intra prediction for a chroma component performed by a video encoder or video decoder, the apparatus comprising one or more electronic circuits or processors arranged to:
  receive input pixel data at an encoder side or receiving residual data at a decoder side, wherein the input pixel data and the residual data are associated with a current chroma prediction block;
  divide the current chroma prediction block into multiple chroma prediction sub-blocks;
  for each chroma prediction sub-block, identifying a corresponding luma prediction block;
  determine a chroma prediction mode for each chroma prediction sub-block from a luma prediction mode associated with the corresponding luma prediction block;
  generate a local chroma predictor for the current chroma prediction block by applying a prediction process to the multiple chroma prediction sub-blocks using respective chroma prediction modes;
  encode chroma coding block associated with the current chroma prediction block using information comprising the local chroma predictor at the encoder side or decode chroma coding block associated with the current chroma prediction block using information comprising the local chroma predictor at the decoder side; and
  apply a different prediction process to a current chroma prediction block to generate a second chroma predictor and generating a combined chroma predictor based on the local chroma predictor and the second chroma predictor, and wherein said encoding the current chroma prediction block using the combined chroma predictor at the encoder side or decoding the current chroma prediction block using the combined chroma predictor at the decoder side.

16. A method of Inter/Intra prediction for a chroma component performed by a video encoder or video decoder, the method comprising:
  receiving input pixel data at an encoder side or receiving residual data at a decoder side, wherein the input pixel data and the residual data are associated with a current chroma prediction block;
  dividing the current chroma prediction block into multiple chroma prediction sub-blocks comprising at least a first chroma prediction sub-block and a second chroma prediction sub-block;
  applying a first chroma prediction mode to the current chroma prediction block to generate a first predictor for the current chroma prediction block;
  applying a second chroma prediction mode to the current chroma prediction block to generate a second predictor for the current chroma prediction block;
  generating a local chroma predictor for the current chroma prediction block, wherein the local chroma predictor comprises a first sub-block predictor corresponding to the first chroma prediction sub-block of the first predictor and a second sub-block predictor corresponding to the second chroma prediction sub-block of the second predictor;
  encoding a chroma coding block associated with the current chroma prediction block using information comprising the local chroma predictor at the encoder side or decoding a chroma coding block associated with the current chroma prediction block using information comprising the local chroma predictor at the decoder side;
  applying a different prediction process to a current chroma prediction block to generate a second chroma predictor and generating a combined chroma predictor based on the local chroma predictor and the second chroma predictor, and wherein said encoding the current chroma prediction block using the combined chroma predictor at the encoder side or decoding the current chroma prediction block using the combined chroma predictor at the decoder side.

17. The method of claim 16, wherein the first chroma prediction mode and the second chroma prediction mode correspond to an Intra prediction mode or an Inter prediction mode.

18. An apparatus of Inter/Intra prediction for a chroma component performed by a video encoder or video decoder, the apparatus comprising one or more electronic circuits or processors arranged to:
  receive input pixel data at an encoder side or receiving residual data at a decoder side, wherein the input pixel data and the residual data are associated with a current chroma prediction block;
  divide the current chroma prediction block into multiple chroma prediction sub-blocks comprising at least a first chroma prediction sub-block and a second chroma prediction sub-block;
  apply a first chroma prediction mode to the current chroma prediction block to generate a first predictor for the current chroma prediction block;
  apply a second chroma prediction mode to the current chroma prediction block to generate a second predictor for the current chroma prediction block;
  generate a local chroma predictor for the current chroma prediction block, wherein the local chroma predictor comprises a first sub-block predictor corresponding to the first chroma prediction sub-block of the first predictor and a second sub-block predictor corresponding to the second chroma prediction sub-block of the second predictor;

encode a chroma coding block associated with the current chroma prediction block using information comprising the local chroma predictor at the encoder side or decode a chroma coding block associated with the current chroma prediction block using information comprising the local chroma predictor at the decoder side; and apply a different prediction process to a current chroma prediction block to generate a second chroma predictor and generating a combined chroma predictor based on the local chroma predictor and the second chroma predictor, and wherein said encoding the current chroma prediction block using the combined chroma predictor at the encoder side or decoding the current chroma prediction block using the combined chroma predictor at the decoder side.

* * * * *